Patented Sept. 10, 1940

2,214,520

UNITED STATES PATENT OFFICE 2,214,520

ADSORBENT PRODUCT AND METHOD OF USING THE SAME

Thomas M. Beck and George I. Klein, Chicago, Ill., assignors to Victor Chemical Works, a corporation of Illinois No Drawing. Application March 6, 1939, Serial No. 260,224

15 Claims. (Cl. 260—403)

This invention relates to an adsorbent product and a method of using the same, and more particularly to the removal of lecithin from liquids containing the same.

Lecithin is an organic phosphatide material which occurs in many vegetable and animal materials and which is used for emulsifying purposes in any number of industries. The lecithin now on the market is largely prepared from soy bean oil, and as marketed, the lecithin normally contains around 37% of oily materials. Normally, this is residual soy bean oil, but for some uses, primarily in the chocolate industry, the soy bean oil is largely replaced by cocoa butter.

The methods heretofore employed to remove lecithin from soy bean oil did not completely remove the lecithin and the resulting soy bean oil contained appreciable quantities of lecithin and therefore gave a positive reaction to the "break" test. In this test the oil is heated within a predetermined temperature range and the occurrence of a "break" in the oil indicates the presence, and to a certain extent, the amount of lecithin present.

By means of the present invention lecithin may be substantially completely removed from soy bean oil at low cost, producing an oil which is considerably lighter in color than previous oils, has an improved odor and taste, is slightly lower in specific gravity, does not emulsify with water, and gives no "break" test on heating to 315° C.

The invention may also be used to remove lecithin from other oils, either as a step in lecithin recovery, or for purification of the oil.

In accordance with this invention oil, such as soy bean oil, is passed through a bed of finely divided prepared commercial tricalcium phosphate preferably in granular form. For example, granules of the material of less than 20 and greater than 40 mesh are quite satisfactory.

A large time of contact is not necessary, even a bed of shallow depth being suitable. The oil may, of course, be contacted in other ways with the adsorbent, for example, by mixing and shaking, following by filtering.

Fused or ignited tricalcium phosphate should be avoided.

The capacity of the adsorbent material varies in accordance with the type of oil being treated. For example, with hexane extracted soy bean oil containing approximately 2.75% of lecithin, the tricalcium phosphate adsorbent had a capacity of approximately 10% of its weight of lecithin, before passing oil showing a positive "break" test. The "break" test employed is described in Gardner's text entitled "Physical and Chemical Examination of Paints and Varnishes," 1935, pages 747, 751.

With soy bean expeller oil the capacity of the adsorbent was about 15%. With soy bean still oil which contains a considerable amount of hexane, the capacity of the adsorbent is about 14%.

Larger amounts of lecithin may be adsorbed at the expense of a less pure oil. In practice, of course, greater capacity may be produced by the use of a counter-current system in which the fresh oil contacts the nearly saturated tricalcium phosphate.

As an example of the process, soy bean expeller oil having a phosphorus content of 0.09%, equivalent to 2.25% of lecithin, was passed through a bed of granular prepared tricalcium phosphate, particles of which were less than 20 and more than 40 mesh in size. The bed of tricalcium phosphate had an aparent density of 0.45. 3½ volumes of expeller oil were passed through the bed before the oil gave a "break" test. The processed oil had a content of approximately .005% of phosphorus indicating the presence of not more than 0.125% of lecithin, whereas the tricalcium phosphate adsorbed approximately 14.75% of its weight of lecithin.

In another instance, using the same oil, by passing approximately 33% more oil through the adsorbent, the adsorbent took up approximately 17.3% by weight of the lecithin.

The adsorbent material with the lecithin on it may be used directly either as a food product or for admixture with other products. Generally it will contain between 5 and 20% of lecithin, and preferably from 10 to 15%.

The tricalcium phosphate as ordinarily employed also removes free fatty acid from the oil (as well as non-saponifiable matter, carotenoid coloring matter and the phosphatides) but its capacity for fattey acids is exhausted well in advance of its lecithin adsorbing capacity in all normal situations. Therefore, in treating oils which contain appreciable amounts of free fatty acids the control of the free fatty acids is usually the limiting factor rather than the control of the lecithin adsorption by the "break" test.

For example, in a test with raw linseed oil containing phosphatide material and 1.2% free fatty acid, the oil was passed through a series of three towers (30"x ½"), each containing 60 grams of 20–30 mesh tricalcium phosphate, at a rate of 45 cc./hours. The original oil was dark in color and gave a positive "break" test. The first 490 cc. of oil passed through the towers had only 0.015% residual free fatty acid, was light in color and showed no "break" when heated to 315° C. After 730 cc. of oil had passed the fatty acid content rose to .34% and at 2194 cc. it was 1.16%. The phosphatide "break" was absent until more than 2000 cc. of oil had been treated. The treated oil was equivalent in quality to well aged commercial refined linseed oil.

The process may be discontinued when the free fatty acid content of the treated oil begins to increase rapidly. For example, the treatment may be discontinued when the free fatty acid content approaches 0.05%.

In the regeneration of the tricalcium prosphate adsorbent in the above case only the first tower was treated, as the capacity of the second and third towers was not exhausted. The procedure for the regeneration was as follows: First, the tower was washed with acetone (750 cc.) which dissolved out the mechanically held oil without dissolving the adsorbed phosphatides and fatty acids. Second, the adsorbent was washed with a mixture of 90% benzene and 10% methanol (1000 cc.) to dissolve out the phosphatide material which may be recovered by distilling off the solvent. The recovery of crude phosphatide material from the tower was 15.5 grams. Third, the adsorbent was washed with a 1% caustic soda in methanol solution (750 cc.) to remove the fatty acids. After evaporating off the methanol, 112 grams of residue containing the sodium soaps formed from the combination of the caustic soda and fatty acids was recovered. This material is designated as soap stock. It is composed of the caustic soda in the wash and the fatty acids removed from the tricalcium phosphate. Fourth, the adsorbent is washed with straight methanol to remove any mechanically entrained caustic and the adsorbent is then completely regenerated and ready for reuse.

In a test with sardine oil, containing 1.26% free fatty acid, dark brown in color and showing a positive "break" test, the same three towers were used. 560 cc. of light yellow oil containing only 0.06% free fatty acid and showing no "break" test were obtained. At 775 cc. the free fatty acid was 0.32% and at 925 cc. it was 0.92%. Even at 925 cc. the color was greatly improved over the original oil and the "break" test was negative. 1.5 grams of phosphatide material were recovered from the benzene-methanol wash from the regeneration of the first tower, and 11.0 grams of soap stock were recovered from the caustic methanol wash.

In another case a commercial grade of soy oil containing 0.30% free fatty acid and a small amount of phosphatide was treated in accordance with the following procedure.

Four towers (1" dia. x 26") were set up, each containing 150 grams of 20–30 mesh tricalcium phosphate having a bulk of 28.2 pounds per cubic foot. Three towers were operated in series, the fourth being ready to be put into service or being regenerated. The oil was passed through the three towers at the rate of 80 cc./hour, induced by a vacuum of 20 cm. Hg. The operation was controlled so that the effluent oil would contain less than 0.05% free fatty acid and not show a positive "break" test. A total of 1920 cc. of oil passed through the towers before the free fatty acid content reached 0.05%. This point was well in advance of the point where a "break" test would indicate the presence of phosphatides. The fourth tower was connected into the system and the first tower regenerated as follows. First, the mechanically held oil was washed from the tower with 750 cc. of acetone. The acetone was distilled off and recovered and the residual 175 grams of oil returned to the raw oil storage. Second, the tricalcium phosphate adsorbent was washed with 1000 cc. of 90% benzene-10% methanol solution. The solvent mixture was recovered by distillation. The residue of 3.6 grams contained the phosphatide material removed from the adsorbent by the mixed solvent. Third, the adsorbent was washed with 750 cc. of a 1% solution of NaOH in methanol. The NaOH combined with the adsorbed free fatty acid and was removed as soap stock. Fourth, the adsorbent was washed with 500 cc. of methanol to remove the adhering caustic from the above third wash. The methanol from the combined third and fourth washings was recovered by distillation leaving a residue of 13 grams of soap stock.

In the first step of regeneration any oil solvent may be used which will not dissolve the adsorbed phosphatides and fatty acids. Ethyl acetate, for example, is a suitable substitute for the acetone used in the above example.

In the second step of regeneration the benzene-methanol mixed solvent may have widely varying proportions. The use of an azeotropic mixture of 60.5% (by weight) benzene and 39.5% methanol simplifies the solvent recovery operation. Any other volatile solvent may be used which will dissolve the phosphatide material without removing the adsorbed free fatty acids.

As a further example of the process, soy bean extracted oil containing approximately 2.75% of lecithin was passed through granular tricalcium phosphate like that mentioned in a previous example. The capacity of the adsorbent for lecithin for this material is somewhat less than for expeller oil. For example, approximately 2 volumes of oil were passed through tricalcium phosphate before subsequent oil showed a positive "break" test. The adsorbent adsorbed 10% of its weight of lecithin.

As in the previous case, the lecithin-tricalcium phosphate mixture may be used directly, if desired.

The extracted oil which had been treated with the adsorbent showed the presence of .125% or less of lecithin.

As a further example of the invention, 675 cc. of corn oil containing approximately 1.5% phosphatide material was passed through 60 grams of 20 to 40 mesh tricalcium phosphate before a positive "break" test resulted in the treated oil.

As a further example of the invention, soy bean still oil containing approximately 82.4% of oil and 17.6% of hexane was passed through the adsorbent until subsequent oil showed a positive "break" test. 3½ volumes of oil were passed through the bed of adsorbent before any oil showed a positive "break" test. The capacity of the tricalcium phosphate for this material was about 14% by weight of lecithin.

The tricalcium phosphate in this instance may be used directly or it may be regenerated in the same manner as in the case of the extracted oil. The tricalcium phosphate-lecithin combination may be used in chocolate in small amounts, the lecithin aiding in the formation of emulsions and the phosphate furnishing the mineral supplement. The combination is also of value in stock feeds where a mineral phosphate is often of considerable value, and the phosphatides are believed to promote an improvement in the quality of the hair of the animal. The tricalcium phosphate content of the product is also of value in counteracting the acidity of the stomach and may be used in diets where an anti-acid material is required.

The caustic soda washing step is of considerable importance in connection with oils containing free fatty acids, inasmuch as these tend otherwise to "poison" the adsorptive material.

In all instances, the soy oil produced was lighter in color than the original, slightly lower in specific gravity, had an improved odor and taste, and gave no "break" test in heating to 315° C. The material did not emulsify with water and contained substantially no non-saponifiable matter.

In carrying out the process, it is advisable to avoid contact of the lecithin with air so far as possible.

The term "lecithin" as used herein includes lecithin proper as well as cephalin and other closely related phosphatides or phosphatide mixtures.

The adsorbent removes the phosphatide material, free fatty acid, carotenoid coloring matter, and also substantially non-saponifiable material. The oil is otherwise substantially unchanged in composition.

The tricalcium phosphate employed is in the ordinary hydroxy form, i. e., in which the $CaO:P_2O_5$ mol ratio is more than 3 to 1. Ordinary commercial tricalcium phosphate is of this type, as is any normally precipitated tricalcium phosphate. The usual commercial grade prepared at a pH of 6.8 to 7.0 has a formula of approximately $3Ca_3(PO_4)_2.Ca(OH)_2$.

This application is a continuation-in-part of our copending application Serial No. 174,123, filed November 11, 1937.

The foregoing detailed description has been given for clearness only, and no unnecessary limitations should be understood therefrom.

We claim:

1. The method of removing lecithin from oil and solvent mixtures containing the same which comprises contacting the oil solvent mixture with adsorbent tricalcium phosphate.

2. The method of removing lecithin from oils containing the same which comprises contacting the oil with adsorbent tricalcium phosphate.

3. The method as set forth in claim 2, in which the oil is soy bean oil.

4. The method of removing lecithin from soy bean oil which comprises contacting at least 2 volumes of oil with finely divided adsorbent tricalcium phosphate for a period sufficient to lower the lecithin content of the oil sufficiently to give a negative "break" test.

5. The method of regenerating tricalcium phosphate having adsorbed lecithin thereon which comprises washing the same with an oil solvent and then with a mixture of benzene and methyl-alcohol.

6. The method of regenerating tricalcium phosphate having adsorbed lecithin thereon which comprises washing the same with an oil solvent and then with a lecithin solvent.

7. The method as set forth in claim 6, in which the oil solvent is acetone.

8. The method of regenerating tricalcium phosphate having adsorbed lecithin thereon which comprises washing the same with an oil solvent, then with a lecithin solvent, and then with a solution of caustic alkali in an organic solvent, and then washing away the caustic alkali.

9. The method as set forth in claim 8, in which the lecithin solvent is a benzene and methanol.

10. The method as set forth in claim 8, in which the caustic solvent is methanol.

11. The method as set forth in claim 8, where the oil solvent is acetone, the lecithin solvent is a mixture of benzene and alcohol, the caustic wash is a solution of caustic soda in methanol, and the final wash is methanol.

12. The method of refining oils of vegetable and animal origin which comprises contacting the oil with a sufficient amount of adsorbent tricalcium phosphate to substantially remove the free fatty acids, lecithin and carotenoid coloring matter.

13. The method of recovering lecithin material from oils containing the same, which comprises adsorbing the lecithin material on adsorbent tricalcium phosphate, washing the lecithin-containing tricalcium phosphate with a preferential oil solvent, then removing the lecithin from the tricalcium phosphate with a volatile lecithin solvent and separating the lecithin from said solvent by distillation of the solvent.

14. A process of purifying animal and vegetable oils and substantially removing free fatty acids therefrom which comprises passing the oil through a mass of granular adsorbent tricalcium phosphate.

15. A process of purifying animal and vegetable oils and fats and substantially removing free fatty acids therefrom, which comprises passing the oil or fat in liquid form through a mass of granular adsorbent tri-calcium phosphate, whereby said fatty acids are retained in the phosphate mass and other impurities present in such oils or fats are absorbed thereby.

THOMAS M. BECK.
GEORGE I. KLEIN.